United States Patent [19]

Nakagawa

[11] Patent Number: 5,316,753

[45] Date of Patent: May 31, 1994

[54] ZEOLITE SSZ-35

[75] Inventor: Yumi Nakagawa, Kensington, Calif.

[73] Assignee: Chevron Research and Technology Company, San Francisco, Calif.

[21] Appl. No.: 959,205

[22] Filed: Oct. 9, 1992

[51] Int. Cl.$^5$ .................... C01B 33/26; B01J 29/06
[52] U.S. Cl. .................... 423/706; 423/328.1; 423/718; 502/64
[58] Field of Search .................... 423/702, 704, 328.1; 502/64

[56] References Cited

U.S. PATENT DOCUMENTS

| | | | |
|---|---|---|---|
| 4,908,342 | 3/1990 | McWilliams et al. | 502/64 |
| 4,962,239 | 10/1990 | Bell et al. | 502/64 |
| 4,975,258 | 12/1990 | Barri | 502/64 |
| 5,053,373 | 10/1991 | Zones | 423/706 |
| 5,106,801 | 4/1992 | Zones et al. | 423/706 |
| 5,190,736 | 3/1993 | Hellring et al. | 423/706 |
| 5,194,235 | 3/1993 | Zones | 423/704 |

Primary Examiner—Anthony McFarlane
Attorney, Agent, or Firm—W. K. Turner; R. J. Sheridan

[57] ABSTRACT

The present invention relates to new crystalline zeolite SSZ-35 prepared by processes for preparing crystalline molecular sieves, particularly large pore zeolites, using conformationally constrained aza-polycyclic ring system templating agents.

22 Claims, No Drawings

ZEOLITE SSZ-35

BACKGROUND OF THE INVENTION

1. Field of the Invention

The present invention relates to new crystalline zeolite SSZ-35 prepared by processes for preparing crystalline molecular sieves, particularly large pore zeolites, using conformationally constrained aza-polycyclic ring system templating agents.

2. State of the Art

In conventional usage the term "molecular sieve" refers to a material having a fixed, open-network structure, usually crystalline, that may be used to separate hydrocarbons or other mixtures by selective occlusion of one or more of the constituents, or may be used as a catalyst in a catalytic conversion process. The term "zeolite" refers to a molecular sieve containing a silicate lattice, usually in association with some aluminum, boron, gallium, iron, and/or titanium. In the following discussion and throughout this disclosure, the terms molecular sieve and zeolite will be used more or less interchangeably. One skilled in the art will recognize that the teachings relating to zeolites are also applicable to the more general class of materials called molecular sieves.

Natural and synthetic crystalline molecular sieves are useful as catalysts and adsorbents. Each crystalline molecular sieve is distinguished by a crystal structure with an ordered pore structure, and is characterized by a unique X-ray diffraction pattern. Thus, the crystal structure defines cavities and pores which are characteristic of the different species. The adsorptive and catalytic properties of each crystalline molecular sieve are determined in part by the dimensions of its pores and cavities. Accordingly, the utility of a particular molecular sieve in a particular application depends at least partly on its crystal structure.

Because of their unique sieving characteristics, as well as their catalytic properties, crystalline molecular sieves are especially useful in applications such as hydrocarbon conversion, gas drying and separation. Although many different crystalline molecular sieves have been disclosed, there is a continuing need for new zeolites with desirable properties for gas separation and drying, hydrocarbon and chemical conversions, and other applications.

Crystalline aluminosilicates are usually prepared from aqueous reaction mixtures containing alkali or alkaline earth metal oxides, silica, and alumina. Crystalline borosilicates are usually prepared under similar reaction conditions except that boron is used in place of aluminum. By varying the synthesis conditions and the composition of the reaction mixture, different zeolites can often be formed.

Organic templating agents are believed to play an important role in the process of molecular sieve crystallization. Organic amines and quaternary ammonium cations were first used in the synthesis of zeolites in the early 1960s as reported by R. M. Barrer and P. J. Denny in J. Chem. Soc. 1961 at pages 971–982. This approach led to a significant increase in the number of new zeolitic structures discovered as well as an expansion in the boundaries of composition of the resultant crystalline products.

Previously, products with low silica to alumina ratios ($SiO_2/Al_2O_3 \leq 10$) had been obtained, but upon using the organocations as components in the starting gels, zeolites with increasingly high $SiO_2/Al_2O_3$ were realized. Some of these materials are summarized by R. M. Barrer 1982, Hydrothermal Chemistry of Zeolites, New York: Academic Press, Inc.

Unfortunately, the relationship between structure of the organocation and the resultant zeolite is far from predictable, as evidenced by the multitude of products which can be obtained using a single quaternary ammonium salt as reported by S. I. Zones et al., 1989, Zeolites: Facts, Figures, Future, ed. P. A. Jacobs and R. A. van Santen, pp. 299–309, Amsterdam: Elsevier Science Publishers, or the multitude of organocations which can produce a single zeolitic product as reported by R. M. Barrer, 1989, Zeolite Synthesis, ACS Symposium 398, ed. M. L. Occelli and H. E. Robson, pp. 11–27, American Chemical Society.

Thus, it is known that organocations exert influence on the zeolite crystallization process in many unpredictable ways. Aside from acting in a templating role, the organic cation's presence also greatly affects the characteristics of the gel. These effects can range from modifying the gel pH to altering the interactions of the various components via changes in hydration (and thus solubilities of reagents) and other physical properties of the gel. Accordingly, investigators have now begun to consider how the presence of a particular quaternary ammonium salt influences many of these gel characteristics in order to determine more rigorously how such salts exert their templating effects.

It has been noted that many of the organocations which have been used as templates for zeolite synthesis are conformationally flexible. These molecules can adopt many conformations in aqueous solution, therefore several templates can give rise to a particular crystalline product. Studies which involved alterations on such conformationally flexible organic amines and cations have been published. For example, one study, Rollmann and Valyocsik, 1985, Zeolites 5, 123, describes how varying the chain length for a series of $\alpha,\delta$-linear diamines resulted in different intermediate-pore products. It has also been recently reported by M. D. Shannon et al., 1991, Nature 353, 417–420 that three different products which have related framework topologies, can be formed from three linear bis-quaternary ammonium templates of varying chain lengths.

Altering the structure of a conformationally rigid organic molecule can also lead to a change in the zeolite obtained, presumably due to the differing steric demands of each template. S. I. Zones, 1989, Zeolites 9, 458–467 reported that in switching from 1,3-dimethylimidazolium hydroxide to 1,3-diisopropylimidazolium hydroxide as template, using the same starting gel ($SiO_2/Al_2O_3 = 100$), the former directs toward formation of ZSM-22 whereas the latter affords ZSM-23. Further investigations of the influence of conformationally constrained templating agents are reported in Y. Nakagawa, et al. Synthesis of Microporous Materials, Volume I, Chapter 16, M. Occelli, H. Robson, ed.; Van Nostrand Reinhold, New York, 1992.

In summary, a variety of templates have been used to synthesize a variety of molecular sieves, including zeolites of the silicate, aluminosilicate, and borosilicate families. However, the specific zeolite which may be obtained by using a given template is at present unpredictable. In fact, the likelihood of any given organocation serving as an effective template useful in the preparation of a molecular sieve is conjectural at best. In particular, organocation templating agents have been used to prepare many different combinations of oxides with molecular sieve properties, with silicates, aluminosilicates, aluminophosphates, borosilicates and silicoaluminophosphates being well known examples.

The new zeolite SSZ-35, which is the subject matter of this invention, was discovered as a result of efforts to identify new templates and investigate the zeolites which could be produced by such templates.

Objects of the Invention

Accordingly, it is the principle object of the present invention to provide a new multidimensional large pore crystalline molecular sieve.

This and other objects are accomplished by the invention summarized below.

SUMMARY OF THE INVENTION

The present invention is directed to a family of crystalline molecular sieves with unique properties, referred to herein as "zeolite SSZ-35" or simply "SSZ-35" and also known as "YN-1". Preferably SSZ-35 is obtained in its silicate, aluminosilicate, or borosilicate form. The term "silicate" refers to a zeolite having a high mole ratio of silicon oxide relative to aluminum oxide, preferably a mole ratio greater than 100. As used herein the term "aluminosilicate" refers to a zeolite containing both alumina and silica and the term "borosilicate" refers to a zeolite containing both boron and silica.

The full scope of the present invention will be apparent to those familiar with molecular sieve synthesis from the following detailed description of the principle features of SSZ-35 and from the examples which accompany the description.

DETAILED DESCRIPTION OF THE INVENTION

Principle Features

The present invention comprises a family of crystalline multidimensional large pore zeolites, SSZ-35. As used herein the term "large pore" means having an average pore size diameter greater than about 6 Angstroms, preferably from about 6.5 Angstroms to about 7.5 Angstroms.

SSZ-35 as prepared has a mole ratio of an oxide selected from silicon oxide, germanium oxide, and mixtures thereof to an oxide selected from aluminum oxide, gallium oxide, iron oxide, boron oxide, titanium oxide and mixtures thereof greater than about 15; and has the x-ray diffraction lines of Table II below. SSZ-35 further has a composition, as synthesized and in the anhydrous state, in terms of mole ratios as follows: (from about 0.25 to about 5.0)Q:(from about 0.05 to about 3.5)$M_2O$:$W_2O_3$:(greater than about 15)$YO_2$ wherein Q is comprised of a relatively rigid polycyclic ring system having a quaternary nitrogen heteroatom, M is an alkali metal cation, W is selected from the group aluminum, gallium, iron, boron, titanium and mixtures thereof, and Y is selected from the group consisting of silicon, germanium, and mixtures thereof. Typical and preferred ranges of oxides are shown as mole ratios in Table I below:

TABLE I

|  | Typical | Preferred |
|---|---|---|
| $YO_2/W_2O_3$ | 10 and greater | 20 and greater |
| $OH^-/YO_2$ | 0.1 to 0.7 | 0.15 to 0.40 |
| $Q/YO_2$ | 0.05 to 0.50 | 0.05 to 0.40 |

TABLE I-continued

|  | Typical | Preferred |
|---|---|---|
| $M^+/YO_2$ | 0.01 to 0.50 | 0.03 to 0.40 |
| $H_2O/YO_2$ | 15 to 100 | 20 to 50 |

SSZ-35 can be made essentially aluminum free, i.e., having a silica to alumina mole ratio of $\infty$. The term "essentially alumina-free" is used because it is difficult to prepare completely aluminum-free reaction mixtures for synthesizing these materials. Especially when commercial silica sources are used, aluminum is almost always present to a greater or lesser degree. The hydrothermal reaction mixtures from which the essentially alumina-free crystalline siliceous molecular sieves may be prepared can be referred to as being substantially alumina free. By this usage is meant that no aluminum is intentionally added to the reaction mixture, e.g., as an alumina or aluminate reagent, and that to the extent aluminum is present, it occurs only as a contaminant in the reagents. An additional method of increasing the mole ratio of silica to alumina is by using standard acid leaching or chelating treatments. However, essentially aluminum-free SSZ-35 can be synthesized directly using essentially aluminum-free silicon sources as the only tetrahedral metal oxide component. SSZ-35 can also be prepared directly as either an aluminosilicate or a borosilicate.

Lower silica to alumina ratios may also be obtained by using methods which insert aluminum into the crystalline framework. For example, aluminum insertion may occur by thermal treatment of the zeolite in combination with an alumina binder or dissolved source of alumina. Such procedures are described in U.S. Pat. No. 4,559,315 issued on Dec. 17, 1985 to Chang, et al.

It is believed that SSZ-35 is comprised of a new framework structure or topology which is characterized by its x-ray diffraction pattern. SSZ-35 zeolites, as-synthesized, have a crystalline structure whose x-ray powder diffraction pattern exhibit the characteristic lines shown in Table II and is thereby distinguished from other known zeolites.

TABLE II

| $2\theta$ | d | $100 \times I/I_0$ |
|---|---|---|
| 7.96 | 11.091 | 100.0 |
| 9.56 | 9.241 | 3.5 |
| 15.37 | 5.759 | 21.2 |
| 18.76 | 4.726 | 11.9 |
| 19.02 | 2.662 | 22.7 |
| 19.24 | 4.609 | 64.8 |
| 19.87 | 4.464 | 31.9 |
| 21.57 | 4.116 | 9.7 |
| 22.78 | 3.900 | 29.3 |
| 24.95 | 3.566 | 27.4 |
| 27.33 | 3.260 | 21.4 |
| 29.09 | 3.067 | 10.7 |

After calcination, the SSZ-35 zeolites have a crystalline structure whose X-ray powder diffraction pattern include the characteristic lines shown in Table III:

TABLE III

| $2\theta$ | d | $100 \times I/I_0$ |
|---|---|---|
| 8.00 | 11.042 | 100.0 |
| 9.67 | 9.143 | 15.5 |
| 15.42 | 5.743 | 1.5 |
| 19.01 | 4.665 | 7.9 |
| 19.44 | 4.562 | 12.0 |
| 19.48 | 4.552 | 12.5 |
| 19.92 | 4.454 | 7.0 |

TABLE III-continued

| 2θ | d | 100 × I/I₀ |
|---|---|---|
| 21.70 | 4.092 | 3.2 |
| 22.84 | 3.891 | 5.0 |
| 24.81 | 3.586 | 6.7 |
| 27.50 | 3.240 | 4.8 |
| 29.41 | 3.035 | 3.9 |

The x-ray powder diffraction patterns were determined by standard techniques. The radiation was the K-alpha/doublet of copper. A scintillation counter spectrometer with a strip-chart pen recorder Was used. The peak heights I and the positions, as a function of 2θ where θ is the Bragg angle, were read from the relative intensities, $100I/I_o$ where $I_o$ is the intensity of the strongest line or peak, and d, the interplanar spacing in Angstroms corresponding to the recorded lines, can be calculated.

The X-ray diffraction pattern of Table II is representative of "as-made" SSZ-35 zeolites Minor variations in the diffraction pattern can result from variations in the silica-to-alumina or silica-to-boron mole ratio of the particular sample due to changes in lattice constants. In addition, sufficiently small crystals will affect the shape and intensity of peaks, leading to significant peak broadening.

Representative peaks from the X-ray diffraction pattern of calcined SSZ-35 are shown in Table III. Calcination can also result in changes in the intensities of the peaks as compared to patterns of the "as-made" material, as well as minor shifts in the diffraction pattern. The zeolite produced by exchanging the metal or other cations present in the zeolite with various other cations (such as $H^+$ or $NH_4^+$) yields essentially the same diffraction pattern, although again, there may be minor shifts in the interplanar spacing and variations in the relative intensities of the peaks. Nothwithstanding these minor perturbations, the basic crystal lattice remains unchanged by these treatments.

The Preparation of SSZ-35 Zeolites

In preparing SSZ-35 zeolites, a conformationally constrained organocation may be used as a crystallization template in the manner of other well known molecular sieve templating agents. Thus, in general, SSZ-35 is prepared by contacting an active source of one or more oxides selected from the group consisting of monovalent element oxides, divalent element oxides, trivalent element oxides, and tetravalent element oxides with an organocation templating agent.

In practice, SSZ-35 is prepared by a process which may be carried out in steps which comprise:

(a) preparing an aqueous solution containing sources of at least one oxide capable of forming a crystalline molecular sieve and at least one conformationally constrained templating agent salt having an anionic counterion which is not detrimental to the formation of SSZ-35;

(b) maintaining the aqueous solution under conditions sufficient to form crystals of SSZ-35; and (c) recovering the crystals of SSZ-35.

Specific templating agents which have been found to produce SSZ-35 and the conditions of preparation are disclosed in commonly assigned concurrently filed U.S. patent application, Ser. No. 07/958,612, entitled "A PROCESS FOR PREPARING MOLECULAR SIEVES USING 3,7-DIAZABICYCLO[3.3.1]NONANE TEMPLATES"; in commonly assigned concurrently filed U.S. patent application, Ser. No. 07/958,636, entitled "A PROCESS FOR PREPARING MOLECULAR SIEVES USING 9-AZABICYCLO[3.3.1]NONANE TEMPLATES"; and in commonly assigned concurrently filed U.S. patent application, Ser. No. 07/958,832, entitled "A PROCESS FOR PREPARING MOLECULAR SIEVES USING A 1,3,3,8,8-PENTAMETHYL-3-AZONIABICYCLO[3.2.1]OCTANE TEMPLATE". The disclosures of these patent applications are fully incoporated herein by reference.

Accordingly, SSZ-35 may comprise the crystalline material and the templating agent in combination with metallic and non-metallic oxides bonded in tetrahedral coordination through shared oxygen atoms to form a cross-linked three dimensional crystal structure. The metallic and non-metallic oxides comprise one or a combination of oxides selected from the group consisting of one or more trivalent element(s), and one or more tetravalent element(s). The trivalent element is preferably selected from the group consisting of aluminum, boron, gallium, iron, titanium and combinations thereof. More preferably, the trivalent element is aluminum or boron. The tetravalent element is preferably selected from the group consisting of silicon, germanium, and combinations thereof. More preferably, the tetravalent element is silicon.

Typical sources of aluminum oxide for the reaction mixture include aluminates, alumina, aluminum colloids, aluminum oxide coated on silica sol, hydrated alumina gels such as $Al(OH)_3$ and aluminum compounds such as $AlCl_3$ and $Al_2(SO_4)_3$. Typical sources of silicon oxide include silicates, silica hydrogel, silicic acid, fumed silica, colloidal silica, tetra-alkyl orthosilicates, and silica hydroxides. Boron, as well as gallium, germanium, titanium, and iron can be added in forms corresponding to their aluminum and silicon counterparts.

Alternatively a source zeolite reagent may provide a source of aluminum or boron. In some cases, the source zeolite may also provide a source of silica. Alternatively, the source zeolite in its dealuminated or deboronated form may be used as a source of aluminum or boron and silica, with additional silicon added using, for example, the conventional sources listed above. Use of a source zeolite reagent as a source of alumina for the present process is more completely described in U.S. Pat. No. 4,503,024 issued on Mar. 5, 1985 to Bourgogne, et al entitled "PROCESS FOR THE PREPARATION OF SYNTHETIC ZEOLITES, AND ZEOLITES OBTAINED BY SAID PROCESS", the disclosure of which is incorporated herein by reference.

Typically, an alkali metal hydroxide and/or an alkaline earth metal hydroxide, such as the hydroxide of sodium, potassium, lithium, cesium, rubidium, calcium, and magnesium, is used in the reaction mixture; however, this component can be omitted so long as the equivalent basicity is maintained. The templating agent may be used to provide hydroxide ion. Thus, it may be beneficial to ion exchange, for example, the halide for hydroxide ion, thereby reducing or eliminating the alkali metal hydroxide quantity required. The alkali metal cation or alkaline earth cation may be part of the as-synthesized crystalline oxide material, in order to balance valence electron charges therein.

The reaction mixture is maintained at an elevated temperature until the crystals of the SSZ-35 zeolite are formed. The hydrothermal crystallization is usually conducted under autogenous pressure, at a temperature between 100° C. and 200° C., preferably between 135° and 180° C. The crystallization period is typically greater than 1 day and preferably from about 4 days to about 20 days.

Preferably the zeolite is prepared using mild stirring or agitation.

During the hydrothermal crystallization step, the SSZ-35 crystals can be allowed to nucleate spontaneously from the reaction mixture. The use of SSZ-35 crystals as seed material can be advantageous in decreasing the time necessary for complete crystallization to occur. In addition, seeding can lead to an increased purity of the product obtained by promoting the nucleation and/or formation of SSZ-35 over any undesired phases. When used as seeds, SSZ-35 crystals are added in an amount between 0.1 and 10% of the weight of silica used in the reaction mixture.

Once the zeolite crystals have formed, the solid product is separated from the reaction mixture by standard mechanical separation techniques such as filtration. The crystals are water-washed and then dried, e.g. at 90° C. to 150° C. for from 8 to 24 hours, to obtain the as-synthesized, SSZ-35 zeolite crystals. The drying step can be performed at atmospheric pressure or under vacuum.

Accordingly, SSZ-35 comprises one or a combination of oxides, said oxides being selected from monovalent elements, divalent elements, trivalent elements, and tetravalent elements. The crystalline material as synthesized will also contain a templating agent.

Crystalline SSZ-35 can be used as-synthesized or can be thermally treated (calcined). Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica to alumina mole ratio. The zeolite can also be steamed; steaming helps stabilize the crystalline lattice to attack from acids. The zeolite can be used in intimate combination with hydrogenating components, such as tungsten, vanadium molybdenum, rhenium, nickel cobalt, chromium, manganese, or a noble metal, such as palladium or platinum, for those applications in which a hydrogenation-dehydrogenation function is desired. Typical replacing cations can include metal cations, e.g., rare earth, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, and Fe are particularly preferred.

The hydrogen, ammonium, and metal components can be ion-exchanged into the SSZ-35. The zeolite can also be impregnated with the metals, or, the metals can be physically and intimately admixed with the zeolite using standard methods known to the art.

Typical ion-exchange techniques involve contacting the synthetic zeolite with a solution containing a salt of the desired replacing cation or cations. Although a wide variety of salts can be employed, chlorides and other halides, acetates, nitrates, and sulfates are particularly preferred. The zeolite is usually calcined prior to the ion-exchange procedure to remove the organic matter present in the channels and on the surface, since this results in a more effective ion exchange. Representative ion exchange techniques are disclosed in a wide variety of patents including U.S. Pat. Nos. 3,140,249 issued on Jul. 7, 1964 to Plank, et al; 3,140,251 issued on Jul. 7, 1964 to Plank, et al; and 3,140,253 issued on Jul. 7, 1964 to Plank, et al.

Following contact with the salt solution of the desired replacing cation, the zeolite is typically washed with water and dried at temperatures ranging from 65° C. to about 200° C. After washing, the zeolite can be calcined in air or inert gas at temperatures ranging from about 200° C. to about 800° C. for periods of time ranging from 1 to 48 hours, or more, to produce a catalytically active product especially useful in hydrocarbon conversion processes.

Regardless of the cations present in the synthesized form of SSZ-35, the spatial arrangement of the atoms which form the basic crystal lattice of the zeolite remains essentially unchanged. The exchange of cations has little, if any effect on the zeolite lattice structure.

SSZ-35 can be formed into a wide variety of physical shapes. Generally speaking, the zeolite can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the aluminosilicate can be extruded before drying, or, dried or partially dried and then extruded.

SSZ-35 can be composited with other materials resistant to the temperatures and other conditions employed in organic conversion processes. Such matrix materials include active and inactive materials and synthetic or naturally occurring zeolites as well as inorganic materials such as clays, silica and metal oxides. The latter may be naturally occurring or may be in the form of gelatinous precipitates, sols, or gels, including mixtures of silica and metal oxides. Use of an active material in conjunction with the synthetic zeolite, combined with it, can improve the conversion and selectivity of the catalyst in certain organic conversion processes. Inactive materials can serve as diluents to control the amount of conversion in a given process so that products can be formed economically without using other means for controlling the rate of reaction. Frequently, zeolite materials have been incorporated into naturally occurring clays, e.g., bentonite and kaolin. These materials, i.e., clays, oxides, etc., function, in part, as binders for the catalyst. It is desirable to provide a catalyst having good crush strength and attrition resistance, because in petroleum refining the catalyst is often subjected to rough handling. This tends to break the catalyst down into powders which cause problems in processing.

Naturally occurring clays which can be composited with SSZ-35 include the montmorillonite and kaolin families, which families include the sub-bentonites and the kaolins commonly known as Dixie, McNamee, Georgia and Florida clays or others in which the main mineral constituent is halloysite, kaolinite, dickite, naorite, or anauxite. Various clays such as sepiolite and attapulgite can also be used as supports. Such clays can be used in the raw state as originally mined or can be calcined, treated with acid, or chemically modified.

In addition to the foregoing materials, SSZ-35 can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-zirconia, silica-alumina-magnesia and silica-magnesia-zirconia. The matrix can be in the form of a cogel.

SSZ-35 can a)so be composited with other zeolites such as synthetic and natural faujasites (e.g., X and Y), erionites, and mordenites. They can also be composited with purely synthetic zeolites. The combination of zeolites can also be composited in a porous inorganic matrix.

SSZ-35 zeolites are useful in hydrocarbon conversion reactions. Hydrocarbon conversion reactions are chemical and catalytic processes in which carbon containing compounds are changed to different carbon containing compounds. Examples of hydrocarbon conversion reactions include catalytic cracking, hydrocracking, dewaxing, alkylation, and olefin and aromatics formation reactions. The catalysts are useful in other petroleum refining and hydrocarbon conversion reactions such as isomerizing n-paraffins and naphthenes, polymerizing and oligomerizing olefinic or acetylenic compounds such as isobutylene and butene-1, reforming, alkylating, isomerizing polyalkyl substituted aromatics (e.g., m-xylene), and disproportionating aromatics (e.g., toluene) to provide mixtures of benzene, xylenes and higher methylbenzenes. The SSZ-35 catalysts have high selectivity, and under hydrocarbon conversion conditions can provide a high percentage of desired products relative to total products.

SSZ-35 zeolites can be used in processing hydrocarbonaceous feedstocks. Hydrocarbonaceous feedstocks contain carbon compounds and can be from many different sources, such as virgin petroleum fractions, recycle petroleum fractions, shale oil, liquefied coal, tar sand oil, and, in general, can be any carbon containing fluid susceptible to zeolitic catalytic reactions. Depending on the type of processing the hydrocarbonaceous feed is to undergo, the feed can contain metal or be free of metals, it can also have high or low nitrogen or sulfur impurities. It can be appreciated, however, that in general processing will be more efficient (and the catalyst more active) the lower the metal, nitrogen, and sulfur content of the feedstock.

The conversion of hydrocarbonaceous feeds can take place in any convenient mode, for example, in fluidized bed, moving bed, or fixed bed reactors depending on the types of process desired. The formulation of the catalyst particles will vary depending on the conversion process and method of operation.

Other reactions which can be performed using the catalyst of this invention containing a metal, e.g., a Group VIII metal such platinum, include hydrogenation-dehydrogenation reactions, denitrogenation and desulfurization reactions.

SSZ-35 can be used in a hydrocarbon conversion reactions with active or inactive supports, with organic or inorganic binders, and with and without added metals. These reactions are well known to the art, as are the reaction conditions.

Using SSZ-35 catalyst which contains a hydrogenation promoter, heavy petroleum residual feedstocks, cyclic stocks and other hydrocrackate charge stocks can be hydrocracked at hydrocracking conditions including a temperature in the range of from 175° C. to 485° C., molar ratios of hydrogen to hydrocarbon charge from 1 to 100, a pressure in the range of from 0.5 to 350 bar, and a liquid hourly space velocity (LHSV) in the range of from 0.1 to 30.

The hydrocracking catalysts contain an effective amount of at least one hydrogenation component of the type commonly employed in hydrocracking catalysts. The hydrogenation component is generally selected from the group of hydrogenation catalysts consisting of one or more metals of Group VIB and Group VIII, including the salts, complexes and solutions containing such. The hydrogenation catalyst is preferably selected from the group of metals, salts and complexes thereof of the group consisting of at least one of platinum, palladium, rhodium, iridium and mixtures thereof or the group consisting of at least one of nickel, molybdenum, cobalt, tungsten, titanium, chromium and mixtures thereof Reference to the catalytically active metal or metals is intended to encompass such metal or metals in the elemental state or in some form such as an oxide, sulfide, halide, carboxylate and the like.

The hydrogenation catalyst is present in an effective amount to provide the hydrogenation function of the hydrocracking catalyst, and preferably in the range of from 0.05 to 25% by weight.

The SSZ-35 containing hydrocracking catalyst may be employed in conjunction with traditional hydrocracking catalysts, e.g., any aluminosilicate heretofore employed as a component in hydrocracking catalysts. Representative of the zeolitic aluminosilicates employable as component parts of hydrocracking catalysts are Zeolite Y (including steam stabilized, e.g., ultra-stable Y), Zeolite X, Zeolite beta (U.S. Pat. No. 3,308,069 issued on Mar. 7, 1967 to Wadlinger, et al), Zeolite ZK-20 (U.S. Pat. No. 3,459,676 issued on Aug. 5, 1969 to Kerr), Zeolite ZSM-3 (U.S. Pat. No. 3,415,736 issued on Dec. 10, 1968 to Pitman), faujasite, MCM-22, LZ-10 (U.K. Patent 2,014,970, Jun. 9, 1982), ZSM-5-type zeolites, e.g., ZSM-5, ZSM-11, ZSM-12, ZSM-23, ZSM-35, ZSM-38, ZSM-48, crystalline silicates such as silicalite (U.S. Pat. No. 4,061,724 issued on Dec. 6, 1977 to Gross, et al), erionite, mordenite, offretite, chabazite, FU-1-type zeolite, NU-type zeolites, LZ-210-type zeolite and mixtures thereof. Traditional hydrocracking catalysts containing amounts of $Na_2O$ less than about one percent by weight are generally preferred. The relative amounts of the SSZ-35 component and traditional hydrocracking component, if any, will depend at least in part, on the selected hydrocarbon feedstock and on the desired product distribution to be obtained therefrom, but in all instances an effective amount of SSZ-35 is employed. When a traditional hydrocracking catalyst (THC) component is employed, the relative weight ratio of the THC to the SSZ-35 is generally between about 1:10 and about 500:1, desirably between about 1:10 and about 200:1, preferably between about 1:2 and about 50:1I, and most preferably is between about 1:1 and about 20:1.

The hydrocracking catalysts are typically employed with an inorganic oxide matrix component which may be any of the inorganic oxide matrix components which have been employed heretofore in the formulation of hydrocracking catalysts including: amorphous catalytic inorganic oxides, e.g., catalytically active silica-aluminas, clays, silicas, aluminas, silica-aluminas, silica-zirconias, silica-magnesias, alumina-borias, alumina-titanias and the like and mixtures thereof. The traditional hydrocracking catalyst and SSZ-35 may be mixed separately with the matrix component and then mixed or the THC component and SSZ-35 may be mixed and then formed with the matrix component.

SSZ-35 can be used to dewax hydrocarbonaceous feeds by selectively removing straight chain paraffins. The catalytic dewaxing conditions are dependent in large measure on the feed used and upon the desired pour point. Generally, the temperature will be between about 200° C. and about 475° C., preferably between about 250° C. and about 450° C. The pressure is typically between about 15 psig and about 3000 psig, preferably between about 200 psig and 3000 psig. The liquid hourly space velocity (LHSV) preferably will be from 0.1 to 20, preferably between about 0.2 and about 10.

Hydrogen is preferably present in the reaction zone during the catalytic dewaxing process. The hydrogen to feed ratio is typically between about 500 and about 30,000 SCF/bbl (standard cubic feet per barrel), preferably about 1000 to about 20,000 SCF/bbl. Generally, hydrogen will be separated from the product and recycled to the reaction zone. Typical feedstocks include light gas oil, heavy gas oils and reduced crudes boiling about 350° F.

The SSZ-35 hydrodewaxing catalyst may optionally contain a hydrogenation component of the type commonly employed in dewaxing catalysts. The hydrogenation component may be selected from the group of hydrogenation catalysts consisting of one or more metals of Group VIB and Group VIII, including the salts, complexes and solutions containing such metals. The preferred hydrogenation catalyst is at least one of the group of metals, salts and complexes selected from the group consisting of at least one of platinum, palladium, rhodium, iridium and mixtures thereof or at least one from the group consisting of nickel, molybdenum, cobalt, tungsten, titanium, chromium and mixtures thereof. Reference to the catalytically active metal or metals is intended to encompass such metal or metals in the elemental state or in some form such as an oxide, sulfide, halide, carboxylate and the like.

The hydrogenation component is present in an effective amount to provide an effective hydrodewaxing and hydroisomerization catalyst preferably in the range of from about 0.05 to 5% by weight. The catalyst may be run in such a mode to increase isodewaxing at the expense of cracking reactions.

SSZ-35 can be used to convert light straight run naphthas and similar mixtures to highly aromatic mixtures. Thus, normal and slightly branched chained hydrocarbons, preferably having a boiling range above about 40° C. and less than about 200° C., can be converted to products having a substantial higher octane aromatics content by contacting the hydrocarbon feed with the zeolite at a temperature in the range of from about 400° C. to 600° C., preferably 480° C. to 550° C. at pressures ranging from atmospheric to 10 bar, and liquid hourly space velocities (LHSV) ranging from 0.1 to 15.

The conversion catalyst preferably contains a Group VIII metal compound to have sufficient activity for commercial use. By Group VIII metal compound as used herein is meant the metal itself or a compound thereof. The Group VIII noble metals and their compounds, platinum, palladium, and iridium, or combinations thereof can be used. Rhenium or tin or a mixture thereof may also be used in conjunction With the Group VIII metal compound and preferably a noble metal compound. The most preferred metal is platinum. The amount of Group VIII metal present in the conversion catalyst should be within the normal range of use in reforming catalysts, from about 0.05 to 2.0 weight percent, preferably 0.2 to 0.8 weight percent.

The zeolite/Group VIII metal conversion catalyst can be used without a binder or matrix. The preferred inorganic matrix, where one is used, is a silica-based binder such as Cab-O-Sil or Ludox. Other matrices such as magnesia and titania can be used. The preferred inorganic matrix is nonacidic.

It is critical to the selective production of aromatics in useful quantities that the conversion catalyst be substantially free of acidity, for example, by neutralizing the zeolite with a basic metal, e.g., alkali metal, compound The zeolite is usually prepared from mixtures containing alkali metal hydroxides and thus have alkali metal contents of about 1-3 weight percent. These high levels of alkali metal, usually sodium or potassium, are unacceptable for most catalytic applications because they greatly deactivate the catalyst for cracking reactions. Usually, the alkali metal is removed to low levels by ion exchange with hydrogen or ammonium ions. By alkali metal compound as used herein is meant elemental or ionic alkali metals or their basic compounds. Surprisingly, unless the zeolite itself is substantially free of acidity, the basic compound is required in the present process to direct the synthetic reactions to aromatics production. The SSZ-35 Zeolite can also be utilized in its borosilicate form to substantially reduce acidity.

The amount of alkali metal necessary to render the zeolite substantially free of acidity can be calculated using standard techniques based on the aluminum content of the zeolite. Under normal circumstances, the zeolite as prepared and without ion exchange will contain sufficient alkali metal to neutralize the acidity of the catalyst. If a zeolite free of alkali metal is the starting material, alkali metal ions can be ion exchanged into the zeolite to substantially eliminate the acidity of the zeolite. An alkali metal content of about 100%, or greater, of the acid sites calculated on a molar basis is sufficient.

Where the basic metal content is less than 100% of the acid sites on a molar basis, the test described in U.S. Pat. No. 4,347,394 issued on Aug. 31, 1982 to Detz, et al which patent is incorporated totally herein by reference, can be used to determine if the zeolite is substantially free of acidity.

The preferred alkali metals are sodium, potassium, and cesium. The zeolite itself can be substantially free of acidity only at very high silica:alumina mole ratios; by "zeolite consisting essentially of silica" is meant a Zeolite which is substantially free of acidity without base neutralization.

Hydrocarbon cracking stocks can be catalytically cracked in the absence of hydrogen using SSZ-35 at liquid hourly space velocities from 0.5 to 50, temperatures from about 260° F. to 1625° F. and pressures from subatmospheric to several hundred atmospheres, typically from about atmospheric to about 5 atmospheres.

For this purpose, the SSZ-35 catalyst can be composited with mixtures of inorganic oxide supports as well as traditional cracking catalyst.

As in the case of hydrocracking catalysts, when SSZ-35 is used as a catalytic cracking catalyst in the absence of hydrogen, the catalyst may be employed in conjunction with traditional cracking catalysts, e.g., any aluminosilicate heretofore employed as a component in cracking catalysts. Representative of the zeolitic aluminosilicates useful as cracking catalysts and also disclosed heretofore as employable as component parts of hydrocracking catalysts are Zeolite Y (including steam stabilized chemically modified, e.g., ultra-stable Y), Zeolite X, Zeolite beta, Zeolite ZK-20, Zeolite ZSM-3, faujasite, LZ-10, ZSM-5-type zeolites, e.g., ZSM-5, ZSM-11, ZSM-12, ZSM-23, ZSM-35, ZSM-38, ZSM- 48, crystalline silicates such as silicalite, erionite, mordenite, offretite, chabazite, FU-1-type zeolite, NU-type zeolites, LZ-210-type zeolite and mixtures thereof. Traditional cracking catalysts containing amounts of $Na_2O$ less than about one percent by weight are generally preferred. The relative amounts of the SSZ-35 component and traditional cracking component, if any, will depend at least in part, on the selected hydrocarbon feedstock and on the desired product distribution to be obtained therefrom, but in all instances an effective amount of SSZ-35 is employed. When a traditional cracking catalyst (TC) component is employed, the relative weight ratio of the TC to the SSZ-35 is generally between about 1:10 and about 500:1, desirably between about 1:10 and about 200:1, preferably between about 1:2 and about 50:1, and most preferably is between about 1:1 and about 20:1.

The cracking catalysts are typically employed with an inorganic oxide matrix component which may be any of the inorganic oxide matrix components which have been employed heretofore in the formulation of FCC catalysts including: amorphous catalytic inorganic oxides, e.g., catalytically active silica-aluminas, clays, silicas, aluminas, silica-aluminas, silica-zirconias, silica-magnesias, alumina-borias, alumina-titanias and the like and mixtures thereof. The traditional cracking component and SSZ-35 may be mixed separately with the matrix component and then mixed or the TC component and SSZ-35 may be mixed and then formed with the matrix component.

The mixture of a traditional cracking catalyst and SSZ-35 may be carried out in any manner which results in the coincident presence of such in contact with the crude oil feedstock under catalytic cracking conditions. For example, a catalyst may be employed containing the traditional cracking catalyst and a SSZ-35 in single catalyst particles or SSZ-35 with or without a matrix component may be added as a discrete component to a traditional cracking catalyst.

SSZ-35 can also be used to oligomerize straight and branched chain olefins having from about 2 to 21 and preferably 2-5 carbon atoms. The oligomers which are the products of the process are medium to heavy olefins which are useful for both fuels, i.e., gasoline or a gasoline blending stock and chemicals.

The oligomerization process comprises contacting the olefin feedstock in the gaseous state phase with SSZ-35 at a temperature of from about 450° F. to about 1200° F., a LHSV of from about 0.2 to about 50 and a hydrocarbon partial pressure Of from about 0.1 to about 50 atmospheres.

Also, temperatures below about 450° F. may be used to oligomerize the feedstock, when the feedstock is in the liquid phase when contacting the zeolite catalyst. Thus, when the olefin feedstock contacts the zeolite catalyst in the liquid phase, temperatures of from about 50° F. to about 450° F., and preferably from 80° F. to 400° F. may be used and a WHSV of from about 0.05 to 20 and preferably 0.1 to 10. It will be appreciated that the pressures employed must be sufficient to maintain the system in the liquid phase. As is known in the art, the pressure will be a function of the number of carbon atoms of the feed olefin and the temperature. Suitable pressures include from about 0 psig to about 3000 psig.

The zeolite can have the original cations associated therewith replaced by a wide variety of other cations according to techniques well known in the art. Typical cations would include hydrogen, ammonium and metal cations including mixtures of the same. Of the replacing metallic cations, particular preference is given to cations of metals such as rare earth metals, manganese, calcium, as well as metals of Group II of the Periodic Table, e.g., zinc, and Group VIII of the Periodic Table, e.g., nickel. One of the prime requisites is that the zeolite have a fairly low aromatization activity, i.e., in which the amount of aromatics produced is not more than about 20% by weight. This is accomplished by using a zeolite with controlled acid activity [alpha value] of from about 0.1 to about 120, preferably from about 0.1 to about 100, as measured by its ability to crack n-hexane.

Alpha Values are defined by a standard test known in the art, e.g., as shown in U.S. Pat. No. 3,960,978 issued on Jun. 1, 1976 to Givens, et al which is incorporated totally herein by reference. If required, such zeolites may be obtained by steaming, by use in a conversion process or by any other method which may occur to one skilled in this art.

SSZ-35 can be used to convert light gas $C_2$–$C_6$ paraffins and/or olefins to higher molecular weight hydrocarbons including aromatic compounds. Operating temperatures of 100° C. to 700° C., operating pressures of 0 to 1000 psig and space velocities of 0.5–40 $hr^{-1}$ WHSV (weight hourly space velocity) can be used to convert the $C_2$–$C_6$ paraffin and/or olefins to aromatic compounds. Preferably, the zeolite will contain a catalyst metal or metal oxide wherein said metal is selected from the group consisting of Groups IB, IIB, VIII and IIIA of the Periodic Table, and most preferably gallium or zinc and in the range of from about 0.05 to 5% by weight.

SSZ-35 can be used to condense lower aliphatic alcohols having 1 to 10 carbon atoms to a gasoline boiling point hydrocarbon product comprising mixed aliphatic and aromatic hydrocarbon. The condensation reaction proceeds at a temperature of about 500° F. to 1000° F., a pressure of about 0.5 psig to 1000 psig and a space velocity of about 0.5 to 50 WHSV. The process disclosed in U.S. Pat. No. 3,894,107 issued on Jul. 8, 1975 to Butter, et al more specifically describes the process conditions used in this process, which patent is incorporated totally herein by reference.

The catalyst may be in the hydrogen form or may be base exchanged or impregnated to contain ammonium or a metal cation complement, preferably in the range of from about 0.05 to 5% by weight. The metal cations that may be present include any of the metals of the Groups I through VIII of the Periodic Table. However, in the case of Group IA metals, the cation content should in no case be so large as to effectively inactivate the catalyst.

The present catalyst is highly active and highly selective for isomerizing $C_4$ to $C_7$ hydrocarbons. The activity means that the catalyst can operate at relatively low temperature which thermodynamically favors highly branched paraffins. Consequently, the catalyst can produce a high octane product. The high selectivity means that a relatively high liquid yield can be achieved when the catalyst is run at a high octane.

The present process comprises contacting the isomerization catalyst with a hydrocarbon feed under isomerization conditions. The feed is preferably a light straight run fraction, boiling within the range of 30° F. to 250° F. and preferably from 60° F. to 200° F. Preferably, the hydrocarbon feed for the process comprises a substantial amount of $C_4$ to $C_7$ normal and slightly branched low octane hydrocarbons, more preferably $C_5$ and $C_6$ hydrocarbons.

The pressure in the process is preferably between 50 psig and 1000 psig, more preferably between 100 psig and 500 psig. The liquid hourly space velocity (LHSV) is preferably between about 1 to about 10 with a value in the range of about 1 to about 4 being more preferred. It is also preferable to carry out the isomerization reaction in the presence of hydrogen. Preferably, hydrogen is added to give a hydrogen to hydrocarbon ratio ($H_2$/HC) of between 0.5 and 10 $H_2$/HC, more preferably between 1 and 8 $H_2$/HC. The temperature is preferably between about 200° F. and about 1000° F., more preferably between 400° F. and 600° F. As is well known to those skilled in the isomerization art, the initial selection of the temperature within this broad range is made primarily as a function of the desired conversion level considering the characteristics of the feed and of the catalyst. Thereafter, to provide a relatively constant value for conversion, the temperature may have to be slowly increased during the run to compensate for any deactivation that occurs.

A low sulfur feed is especially preferred in the present process. The feed preferably contains less than 10 ppm, more preferably less than 1 ppm, and most preferably less than 0.1 ppm sulfur. In the case of a feed which is not already low in sulfur, acceptable levels can be reached by hydrogenating the feed in a presaturation zone with a hydrogenating catalyst which is resistant to sulfur poisoning. An example of a suitable catalyst for this hydrodesulfurization process is an alumina-containing support and a minor catalytic proportion of molybdenum oxide, cobalt oxide and/or nickel oxide. A platinum on alumina hydrogenating catalyst can also work. In which case a sulfur sorber is preferably placed downstream of the hydrogenating catalyst, but upstream of the present isomerization catalyst. Examples of sulfur sorbers are alkali or alkaline earth metals on porous refractory inorganic oxides, zinc, etc. Hydrodesulfurization is typically conducted at 315° C. to 455° C., at 200 psig to 2000 psig, and at a liquid hourly space velocity of 1 to 5. U.S. Pat. No. 5,082,988 issued on Jan. 2, 1992 to Holdermann describes typical conditions for such processes and is incorporated herein by reference.

It is preferable to limit the nitrogen level and the water content of the feed. Catalysts and processes which are suitable for these purposes are known to those skilled in the art.

After a period of operation, the catalyst can become deactivated by sulfur or coke. Sulfur and coke can be removed by contacting the catalyst with an oxygen-containing gas at an elevated temperature. If the Group VIII metal(s) have agglomerated, then it can be redispersed by contacting the catalyst with a chlorine gas under conditions effective to redisperse the metal(s). The method of regenerating the catalyst may depend on whether there is a fixed bed, moving bed, or fluidized bed operation. Regeneration methods and conditions are well known in the art.

The conversion catalyst preferably contains a Group VIII metal compound to have sufficient activity for commercial use. By Group VIII metal compound as used herein is meant the metal itself or a compound thereof. The Group VIII noble metals and their compounds, platinum, palladium, and iridium, or combinations thereof can be used. Rhenium and tin may also be used in conjunction with the noble metal. The most preferred metal is platinum. The amount of Group VIII metal present in the conversion catalyst should be within the normal range of use in isomerizing catalysts, from about 0.05 to 2.0 weight percent, preferably 0.2 to 0.8 weight percent.

SSZ-35 can be used in a process for the alkylation or transalkylation of an aromatic hydrocarbon. The process comprises contacting the aromatic hydrocarbon with a $C_2$ to $C_{16}$ olefin alkylating agent or a polyalkyl aromatic hydrocarbon transalkylating agent, under at least partial liquid phase conditions, and in the presence of a catalyst comprising SSZ-35.

For high catalytic activity, the SSZ-35 zeolite should be predominantly in its hydrogen ion form. Generally, the zeolite is converted to its hydrogen form by ammonium exchange followed by calcination. If the zeolite is synthesized with a high enough ratio of organo-nitrogen cation to sodium ion, calcination alone may be sufficient. It is preferred that, after calcination, at least 80% of the cation sites are occupied by hydrogen ions and/or rare earth ions.

The pure SSZ-35 zeolite may be used as a catalyst, but generally it is preferred to mix the zeolite powder with an inorganic oxide binder such as alumina, silica, silica/alumina, or naturally occurring clays and form the mixture into tablets or extrudates. The final catalyst may contain from 1 to 99 weight percent SSZ-35 zeolite. Usually the zeolite content will range from 10 to 90 weight percent, and more typically from 60 to 80 weight percent. The preferred inorganic binder is alumina. The mixture may be formed into tablets or extrudates having the desired shape by methods well known in the art.

Examples of suitable aromatic hydrocarbon feedstocks which may be alkylated or transalkylated by the process of the invention include aromatic compounds such as benzene, toluene and xylene. The preferred aromatic hydrocarbon is benzene mixtures of aromatic hydrocarbons may also be employed.

Suitable olefins for the alkylation of the aromatic hydrocarbon are those containing 2 to 20, preferrably 2 to 4, carbon atoms, such as ethylene, propylene, butene-1, trans-butene-2 and cis-butene-2, or mixtures thereof. The preferred olefin is propylene. These olefins may be present in admixture with the corresponding $C_2$ to $C_{20}$ paraffins, but it is preferable to remove any dienes, acetylenes, sulfur compounds or nitrogen compounds which may be present in the olefin feedstock stream, to prevent rapid catalyst deactivation. Longer chain alpha olefins may be used as well.

When transalkylation is desired, the transalkylating agent is a polyalkyl aromatic hydrocarbon containing two or more alkyl groups that each may have from 2 to about 4 carbon atoms. For example, suitable polyalkyl aromatic hydrocarbons include di-, tri- and tetra-alkyl aromatic hydrocarbons, such as diethylbenzene, triethylbenzene, diethylmethylbenzene (diethyltoluene), di-isopropylbenzene, di-isopropyltoluene, dibutylbenzene, and the like. Preferred polyalkyl aromatic hydrocarbons are the dialkyl benzenes. A particularly preferred polyalkyl aromatic hydrocarbon is di-isopropylbenzene.

Reaction products which may be obtained include ethylbenzene from the reaction of benzene with either ethylene or polyethylbenzenes, cumene from the reaction of benzene with propylene or polyisopropylbenzenes, ethyltoluene from the reaction of toluene with ethylene or polyethyltoluenes, cymenes from the reaction of toluene with propylene or polyisopropyltoluenes, and sec-butylbenzene from the reaction of benzene and n-butenes or polybutylbenzenes. The production of cumene from the alkylation of benzene with propylene or the transalkylation of benzene with di-isopropylbenzene is especially preferred.

When alkylation is the process conducted, reaction conditions are as follows. The aromatic hydrocarbon feed should be present in stoichiometric excess. It is preferred that molar ratio of aromatics to olefins be greater than four-to-one to prevent rapid catalyst fouling. The reaction temperature may range from 100° F. to 600° F., preferably 250° F. to 450° F. The reaction pressure should be sufficient to maintain at least a partial liquid phase in order to retard catalyst fouling. This is typically 50 psig to 1000 psig depending on the feedstock and reaction temperature. Contact time may range from 10 seconds to 10 hours, but is usually from 5 minutes to an hour. The weight hourly space s velocity (WHSV), in terms of grams (pounds) of aromatic hydrocarbon and olefin per gram (pound) of catalyst per hour, is generally within the range of about 0.5 to 50.

When transalkylation is the process conducted, the molar ratio of aromatic hydrocarbon will generally range from about 1:1 to 25:1, and preferably from about 2:1 to 20:1.

The reaction temperature may range from about 100° F. to 600° F., but it is preferably about 250° F. to 450° F. The reaction pressure should be sufficient to maintain at least a partial liquid phase, typically in the range of about 50 psig to 1000 psig, preferably 300 psig to 600 psig. The Weight hourly space velocity will range from about 0.1 to 10. U.S. Pat. No. 5,082,990 issued on Jan. 21, 1992 to Hsieh, et al describes such processes and is incorporated herein by reference.

SSZ-35 can also be used as an adsorbent with high selectivities based on molecular sieve behavior and also based upon preferential hydrocarbon packing within the pores.

EXAMPLES

The following examples demonstrate but do not limit the present invention.

Example 1

Preparation of an All-Silica SSZ-35

2.0 mmol of 1,3,3,8,8-pentamethyl-3-azoniabicyclo[3.2.1]octane as the hydroxide salt, 0.5 g 1.0 N KOH, 0.62 g Cabosil M-5 and enough water to bring the $H_2O/SiO_2$ of the reaction to 44 were mixed in a 23 mL teflon cup. After heating in a Parr 4745 reactor at 160° C. for 27 days, a settled product was obtained. The product was collected by filtration, washed thoroughly with water, dried, and determined by XRD to be SSZ-35, a novel zeolitic material.

Example 2

Preparation of an All-Silica SSZ-35 Using Seeding

The reaction as described in Example 1 was repeated, with the exception of seeding with 0.005 g of SSZ-35 crystals. In this manner, the reaction time was decreased to 7 days. The X-ray diffraction pattern of the as-made material is shown in Table IV below.

TABLE IV

| 2θ | d | 100 × I/I$_0$ |
|---|---|---|
| 7.96 | 11.090 | 100.0 |
| 9.56 | 9.240 | 3.5 |

TABLE IV-continued

| 2θ | d | 100 × I/I$_0$ |
|---|---|---|
| 12.01 | 7.361 | 1.3 |
| 12.79 | 6.916 | 0.9 |
| 13.54 | 6.536 | 2.9 |
| 15.37 | 5.759 | 21.2 |
| 15.77 | 5.614 | 8.5 |
| 16.05 | 5.517 | 9.7 |
| 18.76 | 4.726 | 11.9 |
| 19.02 | 4.662 | 22.7 |
| 19.24 | 4.609 | 64.8 |
| 19.87 | 4.464 | 31.9 |
| 20.53 | 4.322 | 1.2 |
| 21.57 | 4.116 | 9.7 |
| 22.78 | 3.900 | 29.3 |
| 23.21 | 3.829 | 11.5 |
| 24.18 | 3.678 | 5.2 |
| 24.50 | 3.630 | 21.8 |
| 24.95 | 3.566 | 27.4 |
| 25.22 | 3.528 | 14.9 |
| 25.58 | 3.479 | 11.3 |
| 25.82 | 3.448 | 15.4 |
| 26.11 | 3.410 | 8.0 |
| 26.58 | 3.351 | 12.3 |
| 27.33 | 3.260 | 21.4 |
| 28.42 | 3.138 | 1.2 |
| 29.09 | 3.067 | 10.7 |
| 29.35 | 3.040 | 3.2 |
| 29.95 | 2.981 | 8.4 |
| 30.36 | 2.941 | 5.1 |
| 31.11 | 2.872 | 2.0 |
| 31.60 | 2.829 | 0.9 |
| 31.91 | 2.802 | 1.3 |
| 32.43 | 2.759 | 4.1 |
| 33.13 | 2.702 | 6.8 |
| 33.43 | 2.678 | 3.1 |

Example 3

Calcination of SSZ-35

The material from Example 2 was calcined in the following manner. A thin bed of material was heated in a muffle furnace from room temperature to 120° C. at a rate of 1° C. per minute and held at 120° C. for 3 hours. The temperature was then ramped up to 540° C. at the same rate and held at this temperature for 5 hours, after which it was increased to 594° C. and held there for another 5 hours. A 50/50 mixture of air and nitrogen was passed over the zeolite at a rate of 20 standard cubic feet per minute during heating. Representative X-ray diffraction data for the calcined product of Example 2 appears in Table V below.

TABLE V

| 2θ | d | 100 × I/I$_0$ |
|---|---|---|
| 8.00 | 11.042 | 100.0 |
| 9.67 | 9.143 | 15.5 |
| 12.10 | 7.307 | 8.2 |
| 12.80 | 6.910 | 1.3 |
| 13.67 | 6.474 | 9.7 |
| 15.41 | 5.743 | 1.5 |
| 15.66 | 5.654 | 0.9 |
| 15.90 | 5.570 | 0.2 |
| 19.00 | 4.665 | 7.9 |
| 19.44 | 4.562 | 12.0 |
| 19.48 | 4.552 | 12.5 |
| 19.92 | 4.454 | 7.0 |
| 20.46 | 4.336 | 0.2 |
| 21.70 | 4.092 | 3.2 |
| 22.83 | 3.891 | 5.0 |
| 23.21 | 3.829 | 4.1 |
| 23.52 | 3.780 | 1.7 |
| 24.38 | 3.648 | 1.1 |
| 24.73 | 3.597 | 4.8 |
| 24.80 | 3.586 | 6.7 |
| 24.98 | 3.562 | 3.9 |
| 25.25 | 3.524 | 1.8 |

TABLE V-continued

| 2θ | d | 100 × I/I₀ |
|---|---|---|
| 25.44 | 3.498 | 3.9 |
| 25.79 | 3.451 | 9.0 |
| 26.16 | 3.404 | 1.7 |
| 26.62 | 3.346 | 3.2 |
| 26.78 | 3.326 | 3.6 |
| 27.50 | 3.240 | 4.8 |
| 27.70 | 3.218 | 3.6 |
| 28.35 | 3.146 | 0.3 |
| 28.60 | 3.119 | 0.2 |
| 29.41 | 3.035 | 3.9 |
| 29.90 | 2.986 | 1.6 |
| 30.33 | 2.944 | 3.3 |
| 32.13 | 2.783 | 0.3 |
| 32.36 | 2.765 | 1.0 |
| 32.75 | 2.732 | 1.0 |
| 33.38 | 2.682 | 1.3 |
| 33.78 | 2.651 | 0.8 |

Example 4

Preparation of All Silica SSZ-35

3.53 g of a 0.567 M solution of 3,3-dimethyl-3-azonia-7-methyl-7-aza-bicyclononane as the hydroxide salt, 3.89 g H₂O and 0.5 mL of 1.0 N KOH were added to a teflon cup for a Parr 4745 reactor. Cabosil M-5 (0.62 g, 10 mmol) was then added and the mixture was stirred until it was homogeneous. The reaction was heated at 160° C. in a Blue M oven for 13 days and the solid which was obtained was filtered, washed repeatedly with water, dried and determined by XRD to be SSZ-35.

Example 5

Preparation of All Silica SSZ-35

3.11 g of a 0.483 M solution of N-ethyl-N-methyl-9-azoniabicyclo[3.3.1]nonane as the hydroxide salt, 3.81 g H₂O, 1.0 g 1.0 N KOH and 0.62 g Cabosil M-5 were mixed together and heated to 150° C. After 30 days, a product was isolated and determined by XRD to be SSZ-35 and a minor amount of Kenyaite.

Example 6

Preparation of SSZ-35 Using Seeding 3.89 g of a 0.578 M solution of 1,3,3,8,8-pentamethyl-3-azoniabicyclo[3.2.1]octane as the hydroxide salt, 4.05 g H₂O, 1.5 g 1.0 N KOH, and 0.0146 g Reheis F2000 aluminum hydroxide gel (Reheis Chemical Company) were mixed together to give a homogeneous solution. 0.92 g Cabosil M-5 and 0.01 g of SSZ-35 seed crystals were then added and the mixture was heated to 160° C. and rotated at 43 rpm for 5 days. The starting gel of this example has a SiO₂/Al₂O₃ of 200. The product after filtration, washing with distilled water, and drying in air was the crystalline material designated as SSZ-35. The X-ray diffraction pattern of the as-made material is tabulated in Table VI below.

TABLE VI

| 2θ | d | 100 × I/I₀ |
|---|---|---|
| 8.01 | 11.027 | 100.0 |
| 9.62 | 9.191 | 3.1 |
| 12.07 | 7.329 | 1.5 |
| 12.84 | 6.887 | 0.8 |
| 13.58 | 6.514 | 2.3 |
| 15.42 | 5.740 | 14.1 |
| 15.83 | 5.594 | 8.3 |
| 16.10 | 5.502 | 9.2 |
| 18.82 | 4.712 | 11.4 |

TABLE VI-continued

| 2θ | d | 100 × I/I₀ |
|---|---|---|
| 19.04 | 4.658 | 22.1 |
| 19.30 | 4.596 | 51.5 |
| 19.92 | 4.454 | 27.1 |
| 20.57 | 4.314 | 1.9 |
| 21.62 | 4.106 | 8.1 |
| 22.83 | 3.892 | 21.5 |
| 23.26 | 3.820 | 9.4 |
| 24.22 | 3.672 | 4.7 |
| 24.54 | 3.625 | 12.6 |
| 24.95 | 3.566 | 15.4 |
| 25.28 | 3.520 | 12.5 |
| 25.64 | 3.471 | 9.8 |
| 25.86 | 3.443 | 11.7 |
| 26.14 | 3.407 | 5.1 |
| 26.60 | 3.348 | 10.9 |
| 27.38 | 3.255 | 12.6 |
| 28.49 | 3.130 | 1.4 |
| 29.16 | 3.060 | 7.8 |
| 29.97 | 2.979 | 4.6 |
| 30.38 | 2.940 | 3.2 |
| 31.17 | 2.867 | 7.1 |
| 31.68 | 2.822 | 0.8 |
| 31.97 | 2.797 | 0.9 |
| 32.48 | 2.755 | 2.7 |
| 33.19 | 2.697 | 4.2 |
| 33.50 | 2.673 | 1.9 |

Example 7

Calcination of SSZ-35

The product of Example 6 was subjected to calcination as described in Example 3. The X-ray diffraction pattern of the calcined material is shown below in Table VII below.

TABLE VII

| 2θ | d | 100 × I/I₀ |
|---|---|---|
| 8.03 | 11.007 | 100.0 |
| 9.67 | 9.136 | 10.2 |
| 12.10 | 7.311 | 4.4 |
| 12.86 | 6.881 | 0.7 |
| 13.64 | 6.484 | 7.8 |
| 15.52 | 5.706 | 1.5 |
| 15.94 | 5.555 | 0.6 |
| 16.15 | 5.484 | 0.4 |
| 18.94 | 4.682 | 2.8 |
| 19.08 | 4.647 | 5.8 |
| 19.41 | 4.568 | 16.6 |
| 19.96 | 4.446 | 7.6 |
| 21.70 | 4.093 | 2.3 |
| 22.98 | 3.866 | 6.9 |
| 23.40 | 3.799 | 3.0 |
| 24.32 | 3.657 | 1.1 |
| 24.65 | 3.608 | 4.3 |
| 25.00 | 3.559 | 4.5 |
| 25.26 | 3.523 | 1.9 |
| 25.43 | 3.500 | 4.1 |
| 25.86 | 3.442 | 5.1 |
| 26.30 | 3.386 | 1.8 |
| 26.78 | 3.326 | 5.7 |
| 27.51 | 3.239 | 4.2 |
| 29.39 | 3.037 | 2.8 |
| 30.04 | 2.972 | 0.9 |
| 30.44 | 2.934 | 1.4 |
| 32.66 | 2.740 | 0.7 |
| 33.33 | 2.686 | 1.3 |
| 33.73 | 2.655 | 0.6 |

Example 8

Preparation of SSZ-35 Using Seeding 4.20 g of 0.714 M solution of 3,3-dimethyl-3-azonia-7-methyl-7-aza-bicyclononane as the hydroxide salt, 3.76 g H₂O, 0.75 g 1.0 N KOH and 0.058 g Reheis F2000 were mixed together to give a homogeneous solution. 3.0 g Ludox AS-30 (Dupont) was added, followed by the addition of 0.009 g of seed crystals of SSZ-35. The starting $SiO_2/Al_2O_3$ of this mixture was 50. The reaction was heated to 160° C. and rotated on a spit of a Blue M oven for 15 days, after which a settled product was obtained. After being filtered, washed repeatedly with water, and dried, the sample was determined by XRD to be SSZ-35.

Example 9

Preparation of SSZ-35

4.66 g of a solution of N-ethyl-N-methyl-9-azoniabicyclo[3.3.1]nonane as the hydroxide salt, 1.52 g $H_2O$, 1.2 g 1.0 N KOH and 1.75 g Ludox AS-30 were mixed in a 23 mL teflon liner for a Parr 4745 reactor. 0.573 g of Nalco 1SJ-612 (aluminum oxide coated silica sol) was then added and the reaction was heated at 170° C. for 9 days after which a settled product was obtained and determined by XRD to be SSZ-35. The solid was analyzed and found to have a $SiO_2/Al_2O_3$ of 66.

Example 10

Preparation of SSZ-35

3.68 g of a 0.610 M solution of 1,3,3,8,8-pentamethyl-3-azoniabicyclo[3.2.1]octane as the hydroxide salt, 3.11 g $H_2O$, 2.13 g 1.0 N KOH and 0.112 g $Al_2(SO_4)_3 18H_2O$ were mixed together and stirred to give a homogeneous solution. 0.85 g Cabosil M-5 was then mixed in with stirring, followed by the addition of 0.01 g of seed crystals of SSZ-35. The resulting reaction mixture was heated at 160° C. and rotated at 43 rpm for 7 days. The product which was obtained was determined by XRD to be SSZ-35.

Example 11

Preparation of SSZ-35 Using Seeding 5.19 g of a 0.578 M solution of 1,3,3,8,8-pentamethyl-3-azoniabicyclo[3.2.1]octane as the hydroxide salt, 5.18 g $H_2O$, 1.5 g 1.0 N KOH, and 0.0585 g Reheis F2000 were mixed together to give a clear, homogeneous solution. 0.92 g Cabosil was then stirred in, followed by the addition of 0.02 g of SSZ-35 seed crystals. The reaction was heated at 160° C. and rotated at 43 rpm for 7 days. The solid which was obtained was analyzed and found to have a $SiO_2/Al_2O_3$ of 43 and was designated as SSZ-35 by XRD.

Example 12

Preparation of SSZ-35

24.52 g of 1,3,3,8,8-pentamethyl-3-azoniabicyclo[3.2.1]octane as the iodide salt, 230 g H20 and 158.6 g 1.0 N NaOH were mixed in a 1-liter Teflon liner. 4.64 g Reheis F2000 were dissolved in the solution, followed by the addition of 158.8 g of Ludox AS-30. 0.10 g of seed crystals of SSZ-35 were added, and the Parr 1-liter reactor was heated to 160° over a 24-h period with a stirring rate of 75 rpm. Aliquots were withdrawn from the ractor periodically to check for crystallinity, and after 13 days, crystallization was complete. The product obtained was identified by XRD as SSZ-35, although there was significant broadening of all peaks due to the small crystallite size. This sample was analyzed and found to have a $SiO_2/Al_2O_3$ of 31.

The SSZ-35 product was treated as described in Example 3 and then was analyzed for surface area and pore size distribution using $N_2$ as adsorbate and via the BET method. The surface area of the zeolitic material was 501.63 $m^2/g$ and the micropore volume was 0.197 cc/g, thus exhibiting considerable void volume indicative of a multidimensional zeolite.

Ion exchange of the calcined SSZ-35 material as described above was performed using $NH_4NO_3$ to convert the zeolite from its Na+ form to the corresponding $NH_4+$, and ultimately, the H+ form. Typically the same mass of $NH_4NO_3$ as zeolite was slurried in $H_2O$ at a mass ratio of 25-50:1 $H_2O$ to zeolite. The exchange solution was heated at 95° C. for 2 hours and then filtered or decanted. The process can be repeated up to three more times. Following the final exchange, the zeolite was filtered, washed several times with $H_2O$, and dried. This $NH_4+$-form of SSZ-35 can then be converted to the H+-form by calcination as described in Example 2 to 540° C.

Example 13

Preparation of Borosilicate SSZ-35

2.61 g of a 0.575 M solution of 1,3,3,8,8-pentamethyl-3-azoniabicyclo[3.2.1]octane as the hydroxide salt, 3.28 g $H_2O$, 1.3 g 1.0 N NaOH and 0.019 g $Na_2B_4O_7.10H_2O$ were mixed to give a homogeneous solution. 0.62 g Cabosil M-5 was added, and the mixture was heated to 160° C. and rotated at 43 rpm for 6 days. The product which was obtained was filtered, washed, dried and determined by XRD to be SSZ-35. Representative X-ray diffraction data for this material is shown in Table VIII.

TABLE VIII

| $2\theta$ | d | $100 \times I/I_0$ |
| --- | --- | --- |
| 8.10 | 10.904 | 100.0 |
| 9.70 | 9.110 | 3.3 |
| 12.15 | 7.280 | 1.6 |
| 12.94 | 6.838 | 1.6 |
| 13.67 | 6.474 | 3.2 |
| 15.51 | 5.708 | 26.4 |
| 15.92 | 3.563 | 10.8 |
| 16.18 | 5.472 | 12.9 |
| 18.91 | 4.689 | 15.8 |
| 19.19 | 4.621 | 33.2 |
| 19.40 | 4.571 | 95.8 |
| 20.02 | 4.432 | 43.0 |
| 20.71 | 4.285 | 1.3 |
| 21.71 | 4.091 | 12.9 |
| 22.94 | 3.874 | 37.9 |
| 23.38 | 3.802 | 14.6 |
| 24.34 | 3.654 | 7.8 |
| 24.63 | 3.612 | 25.7 |
| 25.11 | 3.543 | 37.3 |
| 25.39 | 3.505 | 23.3 |
| 25.72 | 3.461 | 14.9 |
| 25.97 | 3.428 | 19.9 |
| 26.25 | 3.392 | 10.0 |
| 26.73 | 3.332 | 15.9 |
| 26.83 | 3.320 | 15.2 |
| 27.46 | 3.245 | 26.0 |
| 28.55 | 3.124 | 1.4 |
| 29.07 | 3.069 | 4.5 |
| 29.27 | 3.049 | 12.8 |
| 29.52 | 3.024 | 5.3 |
| 30.10 | 2.966 | 9.6 |
| 30.54 | 2.924 | 5.9 |
| 31.30 | 2.855 | 1.9 |
| 31.81 | 2.811 | 1.8 |
| 32.12 | 2.784 | 2.2 |
| 32.62 | 2.743 | 7.2 |
| 33.28 | 2.690 | 7.9 |
| 33.60 | 2.665 | 3.7 |

Example 14
Preparation of Borosilicate SSZ-35

3.19 g Of a 0.705 M solution of 3,3-dimethyl-3-azonia-7-methyl-7-aza-bicyclononane as the hydroxide salt, 0.045 g $Na_2B_4O_7.10H_2O$, and 1.36 g of Ludox AS-30 (Dupont) were mixed in a teflon cup of a Parr 4745 reactor to give a starting gel with a $SiO_2/B_2O_3$ of 28. The reaction mixture was heated in a Blue M oven at 150° C. for 12 days, after which the settled solid was collected by filtration, washed repeatedly with water, dried and determined by XRD to be SSZ-35. The product was analyzed and found to contain boron; the $SiO_2/B_2O_3$ was 53.

Example 15
Preparation of Borosilicate SSZ-35

4.66 g of a 0.483 M solution of N-ethyl-N-methyl-9-azoniabicyclo[3.3.1]nonane as the hydroxide salt, 5.26 g $H_2O$, 1.95 g 1.0 N NaOH, and 0.051 g $Na_2B_4O_7.10H_2O$ were mixed in a 23 mL teflon liner. 0.93 g Cabosil M-5 was added and stirred so that a homogeneous solution was obtained. The mixture was heated at 160° C. and rotated at 43 rpm for 13 days. The settled product was filtered, washed, dried and determined by XRD to be SSZ-35.

Example 16
Determination of the Constraint Index for SSZ-35

The hydrogen form of the zeolite of Example 12 (after treatment according to Examples 3 and 12) was pelleted at 2-3 KPSI, crushed and meshed to 20-40, and then 0.50 grams was calcined at 1000° F. in air for 4 hours and cooled in a desiccator. 0.50 grams was packed into a ⅜" stainless steel tube with alundum on both sides of the zeolite bed. A Lindburg furnace was used to heat the reactor tube. Helium was introduced into the reactor tube at 10 cc/min. and at atmospheric pressure. The reactor was taken to 600° F., and a 50/50, w/w feed of n-hexane and 3-methylpentane was introduced into the reactor at a rate of 8 μl/min. Feed delivery was made via Brownlee pump. Direct sampling onto a gas chromatograph began after 10 min. of feed introduction. The constraint index value was calculated from gas chromatographic data using methods known in the art and found to be 0.2. At 600° F. and 40 minutes on-stream, feed conversion was greater than 85%. After 430 minutes, conversion was still greater than 60%. It can be seen that this novel SSZ-35 zeolite has very high cracking activity, indicative of strongly acidic sites. In addition, the low fouling rate indicates this catalyst has good stability. The low C.I. of 0.2 shows a preference for cracking the branched alkane (3-methylpentane) over the linear n-hexane, which is behavior typical of large-pore zeolites.

Example 17
The Use of SSZ-35 to Convert Methanol

The hydrogen form of the zeolite of Example 11 (after treatment according to Examples 3 and 12) was pelleted at 2-3 KPSI, then crushed and meshed to 20-40. 0.50 grams was loaded into a ⅜" stainless steel reactor tube with alundum on the side of the zeolite bed where the feed was introduced. The reactor was heated in a Lindberg furnace to 1000° F. for 3 hours in air, and then the temperature was reduced to 752° F. in a stream of nitrogen at 20 cc/min. A 22.1% methanol feed (22.1 g methanol/77.9 g $H_2O$) was introduced into the reactor at a rate of 1.31 cc/hr. The conversion at 10 minutes was close to 100% and after 24 hours was still greater than 75%. SSZ-35 makes very little light gas and produces considerable liquid product under these conditions. A large proportion of product is due to the formation of durenes, penta- and hexamethylbenzene. Formation of penta- and hexamethylbenzene again is indicative of a large-pore zeolite, as the equilibrium diameter of the latter is 7.1 Angstroms (Chang, C. D. "Methanol to Hydrocarbons" Marcel Dekker, 1983).

Example 18
Preparation of Palladium Containing SSZ-35 Hydrocracking Catalyst The zeolite from Example 10 was treated with palladium.

0.754 Grams of product from Example 10 in the hydrogen form (following treatment as described in Examples 3 and 12) was added to 7.54 grams of $H_2O$ and 1.77 grams of a 0.148 M $NH_4OH$ solution to give a solution buffered at pH 9.5. Approximately 0.5 wt % Pd was loaded onto the zeolite by ion-exchange using a 0.05 M $Pd(NH_3)_4.2NO_3$ solution. The mixture was stirred at room temperature for 5 hours. The solids were filtered and washed with 1 liter of water, dried, and calcined to 900° F. in air for 3 hours.

The produce was tested for its activity as a component in hydrocracking. 0.5 grams of catalyst was used for the test which consisted of running 1 mL/hour of n-hexadecane feed with 160 mL/minute of $H_2$ under the following conditions:

| Temperatrue | 590° F. |
|---|---|
| WHSV | 1.55 |
| PSIG | 1200 |

The results of the test are shown below:

| $nC_{16}$ Conversion | 98.2% |
|---|---|
| Isomerization Selectivity | 22.9% |
| Cracking Selectivity | 77.1% |
| $nC_{16}$ Cracking Conversion | 75.7% |
| C5+/C4 | 6.8 |
| C4 i/n | 2.54 |
| C5 i/n | 4.56 |
| C6 i/n | 4.71 |

It can be seen that the SSZ-35 catalyst exhibited 98.2% conversion (76% cracking selectivity) of n-hexadecane under the conditions tabulated above. The C4-C6 i/n's are high compared to Pd-Y catalysts; the C5+C6 octane (R+M/2) for SSZ-35 was 77 as compared to 72 for a Pd-Y catalyst run under similar conditions. The C5+ liquid yield for SSZ-35 catalysts are slightly lower than those obtained for Y-zeolite catalysts (87% vs 94%), however, modifications of SSZ-35 acid sites and/or crystallite size can lead to improvements in the liquid yield with no adverse effect on octane number. Thus, SSZ-35 catalysts exhibit good hydrocracking activity, in particular, $C_4$-$C_6$ i/n ratios are desirably high.

Example 19

Cumene Synthesis over an SSZ-35 Catalyst

The hydrogen form of SSZ-35 (HSSZ-35) was prepared by ammonium exchange and calcination of SSZ-35 powder. The HSSZ-35 powder was formed into 10–20 mesh granules and tested as a catalyst for cumene synthesis. A liquid mixture of benzene and propylene in a 7.2 to 1.0 molar ratio was passed upflow through a bed of SSZ-35 granules at 5.7 total weight hourly space velocity, 325° F., and 600 psig. The reactor effluent contained 89.3% cumene on a benzene-free weight basis. The remaining product consisted largely of di- and tri- isopropylbenzenes which can be converted to additional cumene via transalkylation.

Example 20

Reforming of Light Naphtha over an SSZ-35 Catalyst

Eleven grams of SSZ-35 powder in 50 ml of deionized water were titrated with 0.1 N KOH solution until the pH was stable at 10.0. The powder was recovered by filtration, dried, and formed into 10–20 mesh granules. The granules were then calcined at 950° F. for four hours and then impregnated by the incipient wetness method with $Pt(NH_3)_4Cl_2.H_2O$ solution. After drying and calcination, the final catalyst contained 0.6 wt% platinum.

A light naphtha feed consisting primarily of $C_6$ and $C_7$ paraffins and naphthenes was reacted over the Pt-SSZ-35 catalyst prepared above to produce benzene and toluene with better than 60 wt% selectivity at high conversions. The reaction was carried out at 875° to 1000° F., 50 psig, with hydrogen to naphtha feed molar ratio of 5.0.

What is claimed is:

1. A zeolite having a mole ratio of an oxide selected from silicon oxide, germanium oxide and mixtures thereof to an oxide selected from aluminum oxide, gallium oxide, iron oxide, titanium oxide, boron oxide and mixtures thereof greater than about 15 and having the X-ray diffraction lines of Table II.

2. A zeolite having an average pore size diameter greater than about 6 Angstroms and having the X-ray diffraction lines of Table II.

3. A zeolite according to claim 1 having a composition, as synthesized and in the anhydrous state, in terms of mole ratios as follows:

wherein Q is a polycyclic ring system cation having a quaternary nitrogen heteroatom, M is an alkali metal cation, W is selected from the group aluminum, gallium, iron, titanium, boron, and mixtures thereof, and Y is selected from the group consisting of silicon, germanium, and mixtures thereof.

4. A zeolite according to claim 3 wherein W is aluminum and Y is silicon.

5. A zeolite according to claim 3 wherein W is boron and Y is silicon.

6. A zeolite prepared by thermally treating a zeolite having a composition, as synthesized and in the anhydrous state, in terms of mole ratios as follows:

| | |
|---|---|
| $YO_2/W_2O_3$ | 15 or greater |
| $O/YO_2$ | 0.01 to 0.10 |
| $M+/YO_2$ | less than 0.5 | wherein O is a polycyclic ring system cation having a quaternary nitrogen heteroatom, M is an alkali metal cation, W is selected from the group aluminum, gallium, iron, titanium, boron, and mixtures thereof, and Y is selected from the group consisting of silicon, germanium, and mixtures thereof, at a temperature of from about 200° C. to about 800° C., said zeolite having the x-ray diffraction lines of Table III.

7. The zeolite of claim 6 wherein W is boron and Y is silicon.

8. The zeolite of claim 7 wherein the boron in said zeolite in excess of 100 parts per million is replaced by element other than boron in a post-synthesis treatment.

9. The zeolite of claim 7 wherein the replacing element is a Group IIIA metal or a first row transition metal.

10. The zeolite of claim 9 wherein the replacing element is aluminum, chromium, gallium, iron, silicon, titanium, zinc, or mixtures thereof.

11. The zeolite of claim 8 wherein the replacing element is aluminum.

12. The zeolite of claim 6 which is in the hydrogen form and has been prepared by ion exchanging with an acid or with a solution of an ammonium salt followed by a second thermal treatment.

13. The zeolite of claim 10 wherein W is aluminum and Y is silicon.

14. The zeolite of claim 10 wherein W is boron and Y is silicon.

15. A catalyst comprising the zeolite of claim 12.

16. A catalyst comprising the zeolite of claim 13.

17. A catalyst comprising the zeolite of claim 14.

18. A catalyst comprising the zeolite of claim 12 which is neutralized with a basic metal and substantially free of acidity.

19. A catalyst comprising the zeolite of claim 14 which is neutralized with a basic metal and substantially free of acidity.

20. A catalyst comprising the zeolite of claim 13 which is neutralized with a basic metal and substantially free of acidity.

21. The zeolite of claim 6 wherein W is aluminum and Y is silicon.

22. A zeolite having a mole ratio of an oxide selected from silicon oxide, germanium oxide and mixtures thereof to an oxide selected from aluminum oxide, gallium oxide, iron oxide, titanium oxide, boron oxide and mixtures thereof greater than about 15 and having the X-ray diffraction lines of Table III.

* * * * *

UNITED STATES PATENT AND TRADEMARK OFFICE
CERTIFICATE OF CORRECTION

PATENT NO. : 5,316,753
DATED : May 31, 1994
INVENTOR(S) : Yumi Nakagawa

It is certified that error appears in the above-identified patent and that said Letters Patent is hereby corrected as shown below:

Claim 3, Col. 25, line 49:     Table is missing, please add:

| | |
|---|---|
| $YO_2/W_2O_3$ | 15 or greater |
| $O/YO_2$ | 0.01 to 0.10 |
| $M+/YO_2$ | less than 0.05 |

Signed and Sealed this

Sixteenth Day of August, 1994

Attest:

BRUCE LEHMAN

Attesting Officer     Commissioner of Patents and Trademarks